April 5, 1966   B. STAHMER   3,244,293
BATTERY OPERATED TRACK HOIST
Filed Sept. 23, 1963   3 Sheets-Sheet 2

INVENTOR.
BERNHARDT STAHMER

April 5, 1966   B. STAHMER   3,244,293
BATTERY OPERATED TRACK HOIST
Filed Sept. 23, 1963   3 Sheets-Sheet 3
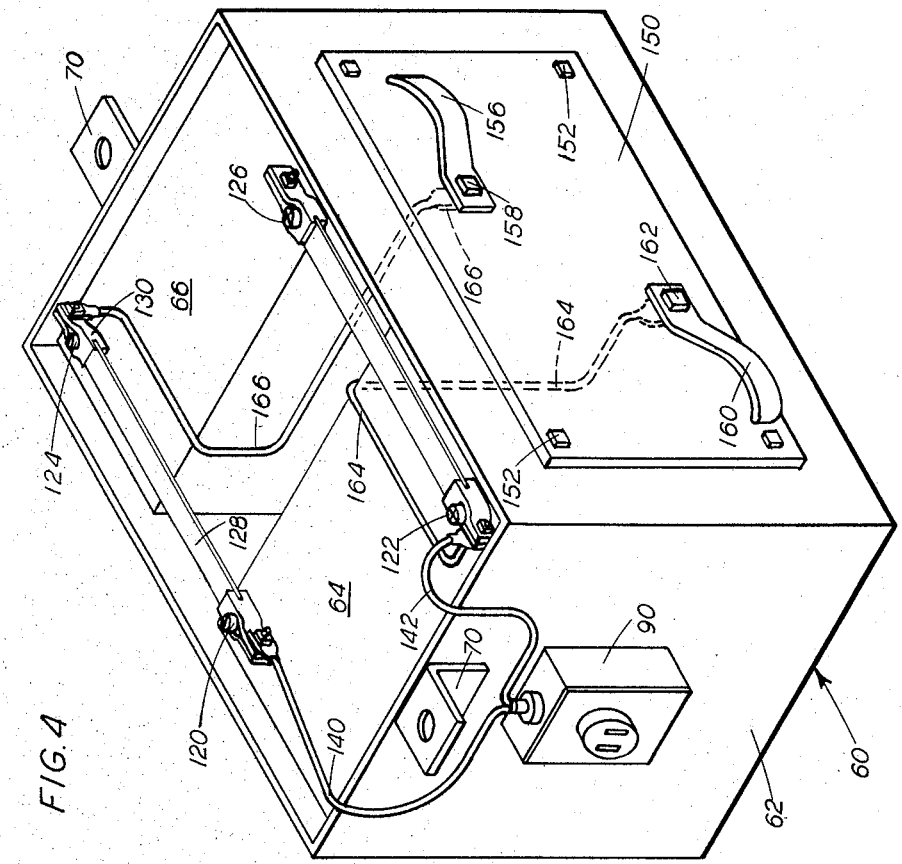
INVENTOR.
BERNHARDT STAHMER
BY

United States Patent Office 3,244,293
Patented Apr. 5, 1966

3,244,293
BATTERY OPERATED TRACK HOIST
Bernhardt Stahmer, 1509 Chicago St., Omaha, Nebr.
Filed Sept. 23, 1963, Ser. No. 310,581
3 Claims. (Cl. 212—131)

The invention relates to material handling means and more particularly to a cordless hoist for conveyor systems.

In manufacturing plants and repair shops overhead conveyors are used to transport parts from one operation to the next and in instances where such parts are extremely heavy, hand operated hoists have been used which, of course, is time consuming and interrupts an assembly line operation within such plants.

A particular object is to provide means for making practical use of storage battery power with the storage battery assembly moving along the track with the hoist to eliminate the need for cumbersome electrical cords, this latter, except for the practicality, having been proposed before in the prior art.

Battery-carrying units heretofore have been adapted to operate only on straight tracks and it is an object of this invention to provide flexibility in a hoist and battery assembly achieved in a practical way for allowing the assembly to follow curves in a track.

The avoidance of the need for lengthy extension cords has been done by providing electrical conductors extending parallel with the hoist track and with trolley means for following the conductors to deliver the current. However, such installations are extremely costly involving expensive bus bar conductor and trolley ducts with problems at points where track and trolley duct enter a separate bay of a building, these problems not being present when a battery power source can move with the hoist without need for changing a trolley from one track section to the other, or the like, as has been a nuisance of the prior art.

Batteries have not been successfully popularized for use with hoists in the prior art for the further reason that batteries run down quickly when there are high power requirements.

The nuisance of recharging batteries involves making connection with them from a charging assembly as has, as a first deterrent, the labor involved. As a hoist and battery would be disposed at the ceiling, one must climb up to it in order to make connection to a battery from a charger.

Apart from the labor involved, there is a second deterrent, which is procrastination. Workers might "put off" the setting up for recharging and discover later in the day that in the middle of an emergency need, the battery is "dead."

Still another deterrent is forgetfulness. It is easier to forget that which is laborious or time-consuming because it is more easy to forget anything that is relatively more unpleasant. An easy and pleasant solution to the problem is provided as an objective of this invention in the form of a special battery charging "rack" disposed "at the track," preferably by providing special conductors on the battery adapted to engage current-carrying charging conductors mounted in a position for engaging and charging the battery while the battery is on the track by simply moving the battery along the track until it is in a position to engage the charging conductors.

Other and further objects and advantages of the present invention will be apparent from the following detailed description, drawings and claims, the scope of the invention not being limited to the drawings themselves as the drawings are only for the purpose of illustrating a method by which the principles of this invention can be applied.

Other embodiments of the invention utilizing the same or equivalent principles may be used and structural changes may be made as desired by those skilled in the art without departing from the present invention and the purview of the appended claims.

In the drawings:

FIGURE 4 is a perspective view of the battery assembly of the invention as seen partially from the top.

Figure 1:
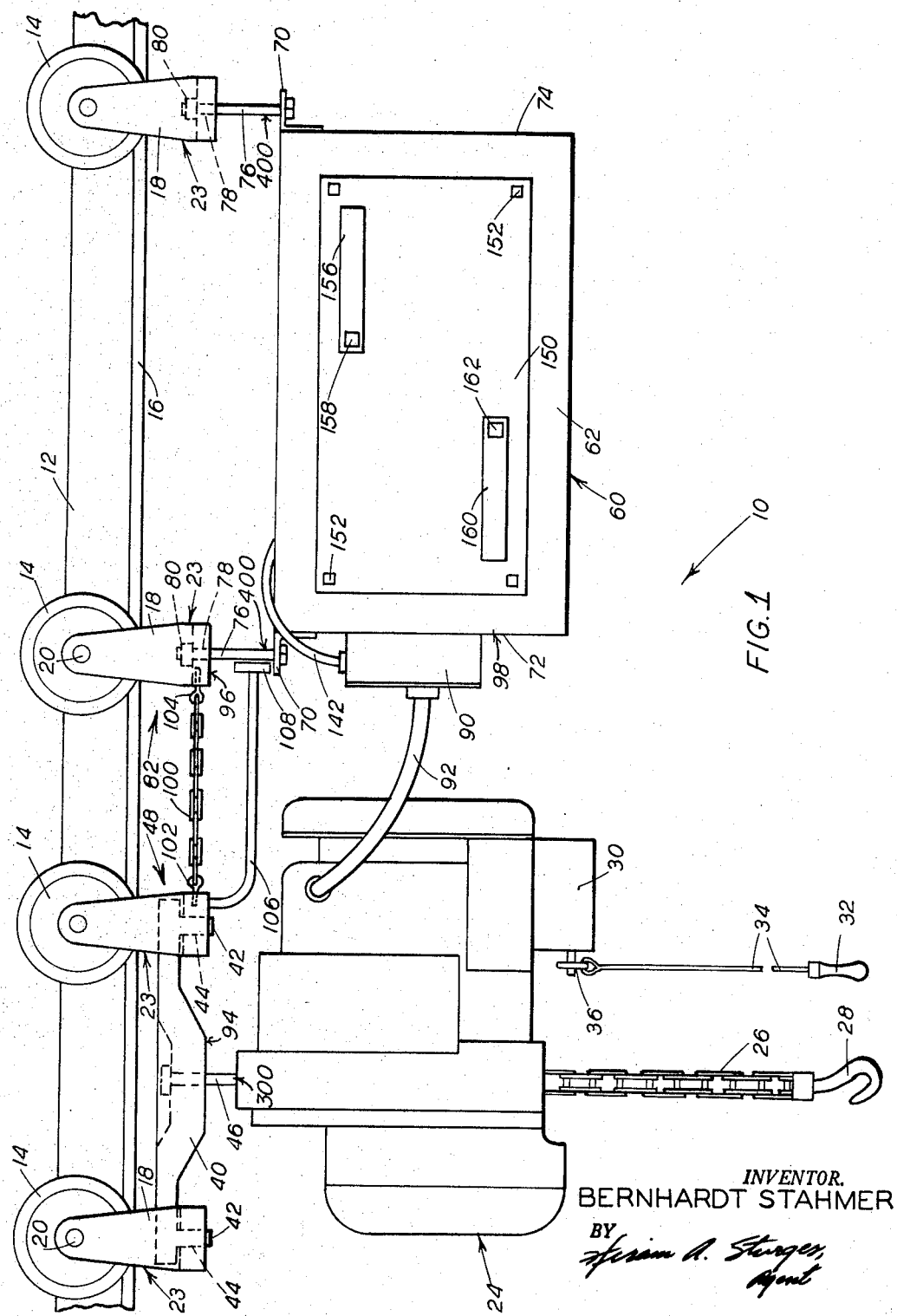
FIGURE 1 is a side elevation of the invention suspended from a track, the track being broken away for convenience of illustration as is also a toggle cord.

Referring to the accompanying drawings and first to FIGURE 1, a hoist assembly is generally indicated at 10 shown suspended from an overhead conveyor track 12 by means of trolley wheels 14 in pairs, a wheel of each pair on either side of the track 12 and resting on shoulders outwardly extended from the lower end of the track 12.

U-shaped yokes 18 provided with axle pins 20 which have upward ends rotatably mounting the said trolley wheels 14 depend downwardly from the said wheels. The trolley wheels and yoke comprise track followers generally indicated at 23. The foregoing is conventional with respect to overhead conveyor systems.

Referring to FIGURE 1 the electrical hoist generally shown at 24 is of a direct current motor type having a roller chain 26 and hook 28 for lifting and carrying parts. The electrical hoist is further provided with a reverse motion switch box 30, toggles 32 and cords 34 attached as at 36 to the switch box 30. Pulling or releasing on the toggle 32 raises or lowers the roller chain 26 or if the toggle is left at the neutral position no motion occurs.

A beam 40 extended between the two yokes immediately above the hoist 24 is provided with downwardly extended pivot pins 42 which are received within apertures 44 vertically disposed through a horizontal medial portion of the said yokes 18 whereby the pairs of trolley wheels 14 connected by the beam 40 are able to go around sharp curves on the track 12 without binding. A suspension bolt 46 passed downwardly through the middle of the beam 40 is threadedly secured to an upward portion of the said hoist 24. The beam 40 and associated yokes 18 and wheels 14 comprise a first section track follower assembly generally indicated at 48.

The battery assembly is generally indicated at 60 having a rectangular shaped battery box 62 in which two storage batteries 64 and 66 are positioned.

Outwardly extended angle irons 70 are welded upwardly on the forward end 72 and rearward end 74 of the rectangular battery box 62. Further suspension bolts 76 extend upwardly through the angle iron 70 and through apertures 78 provided in the lower medial yoke portion of the two track followers 23 that are above the battery assembly 16. Nuts 80 threaded on to the suspension bolts 76 securing said bolts to the yokes 18 whereby the battery assembly 60 and its track followers may also travel around acute curves in a conveyor system without binding. The yokes 18 above the battery assembly 16 and the trolley wheels 14 attached thereto comprise a second section track follower assembly 82.

The forward end 72 of the battery box 62 is provided with a terminal box 90 into which a plug end of a cord 92 is engaged and extends forwardly therefrom to the electrical hoist 24 and forms electrical interconnection means therefor.

A flexible chain 100 is attached by an eye bolt 102 to the rearward yoke 18 above the hoist 24 and the rearward end of the chain 100 is similarly attached by an eye bolt 104 to the forward yoke 18 above the battery assembly 16. A bumper bar 106 is welded at its forward end to the rearward yoke 18 above the hoist 24 and extends downwardly and rearwardly therefrom and terminates in a bumper 108 disposed at right angles to the bar 106 and positioned immediately in front of the forward battery box suspension bolt 76 whereby the first said unit 94 is flexibly held separated from the second unit 96.

Referring to FIGURE 4 the battery 64 is provided with a negative terminal post 120 and a positive terminal post 122. Similarly the battery 66 has a negative post 124 and a positive post 126. A battery strap of conductive material 128 extends between the negative posts 120 and 124 and is secured thereto by clamps 130. In a similar way a further strap 132 extends between the positive posts 122 and 126 whereby the two batteries are electrically connected in parallelism.

Still as best shown in FIGURE 4, an insulated wire 140 leads from the negative terminal 120 to the terminal box 90 and a similar wire 142 extends from the positive battery post 122 to the terminal box 90.

One side of the battery box 62 is provided with a thin rectangular insulating block 150 secured thereto by bolts 152. An electrical contact brush 156 of conductive leafspring material is secured to the forward and rearward end of the insulation block 150 by a bolt 158. A similar contact brush 160 is secured by a bolt 162 to a lower and upward portion of the insulation block 150. The bolt 162 passes through the insulation block 150 and is connected to an electrical cable 164 within the battery box 62 which latter extends upwardly between the batteries 64 and 66 and to the positive terminal 122.

In a similar manner the bolt 158 of the brush 156 extends into the box 62 and is provided with a cable 166 which latter extends therefrom to the negative terminal 124.

Figure 2:
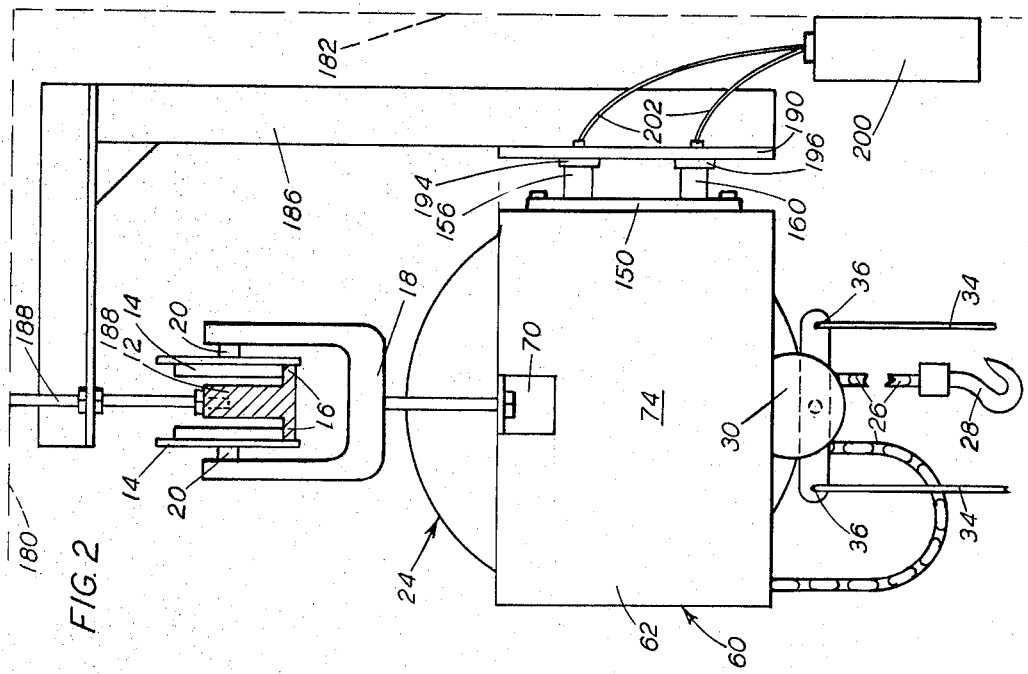
FIGURE 2 is an end elevation showing the invention in a position for receiving a charge of electricity.
Figure 3:
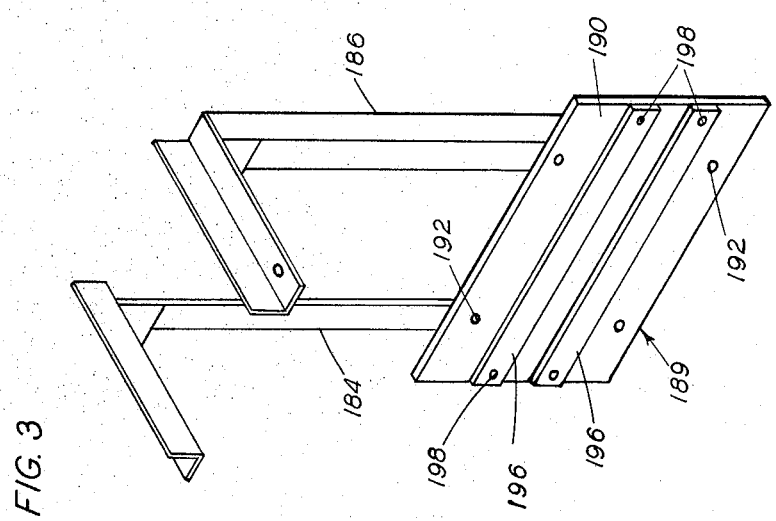
FIGURE 3 is a perspective view of a charging contact frame.

Referring now to FIGURES 2 and 4 a ceiling surface of a manufacturing plant is indicated by dotted lines at 180 and a side wall of such a plant is also indicated by means of dotted lines at 182. Two spaced apart inverted L-shaped frames 184 and 186 are suspended from the ceiling 180 by bolts 188 which latter are also used to suspend the described track 12. A further rectangular insulation block 190 extends between the spaced apart frames 184 and 186 and secured thereto by rivets 192. The insulation block 190 is provided with two horizontally disposed spaced apart elongated bus bars, and upper bar 194 and a lower bar 196 similarly secured thereto by rivets 198.

As shown only in FIGURE 2, a battery charger or rectifier 200 is shown disposed against the vertical wall 182 and is connected to a source of electrical energy, such connection is not shown for convenience of illustration. Two charger wires 202 extend from the charger 200, one to the rivet 198 of the upper bus bar 194 and another of the wires 202 extends to a rivet 198 of the lower bus bar 196. The above described parts comprise a battery charger assembly 204.

As best seen in FIGURE 2 and at the end of a period of work or at other convenient times the battery operated hoist 10 is pulled over to a position in front of the charger assembly 204, and with the brushes 150 and 156 in contact with the bus bars 194 and 196, electrical current will pass over the wires 202 from the charger 200 to the said brushes and to positive and negative terminals of the said batteries 64 and 66.

The hoist assembly 10 of this invention may be considered to have first and second track follower assemblies generally indicated at 48 and 82, respectively, each forming a part of first and second movable units generally indicated at 94 and 96 respectively.

The first movable unit 94 further has in it the suspension bolt or first suspension means 46. The second movable unit 96 has in it battery suspension means generally indicated at 98 and having as its parts the battery box 62, angle iron 70 and suspension bolt 76.

The second track follower 82 will be understood to be formed of the two yokes 18 and the two trolley wheels 14 attached thereto.

It will be seen that the first track follower assembly 48 and a first suspension means 300 form a first movable unit generally indicated at 94 and that a second track follower assembly 82 and a suspension means 400 form a second movable unit generally indicated at 96.

The suspension means 300 is identified solely by the suspension bolt 46 inasmuch as the other parts suspending the bolt 46 from the track 12 can be considered parts of the first track follower assembly 48. However, the second suspension means 400 has as its parts two suspension bolts 46 and also the battery suspension means 98, the latter having as one of its parts the battery box 62, other parts being angle irons 70. The yokes 18 and trolley wheels 14 and their axles 20 can be considered parts of the second track follower assembly 82.

In the operation of the invention it will be seen that the hoist 24 and battery assembly 60 may freely travel down the conveyor system of a manufacturing plant and provide an extremely convenient method for handling awkward parts and heavy weights and as shown and described fulfills the objects of the invention as set forth herein.

From the foregoing description it is thought to be obvious that a Battery Operated Track Hoist constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

1. In a hoist assembly, a substantially horizontal elongated track, first and second track follower assemblies mounted on said track, an electrical hoist having a direct current motor, a first suspension means suspending said electrical hoist from said first track follower assembly, a battery assembly, a second suspension means suspending said battery assembly from said second track follower assembly, a flexible electric cord means interconnecting said battery assembly and said motor whereby a hoist assembly is provided which has its own source of power, said track follower assemblies each having at least one pair of trolley wheels disposed with wheels opposite each other on opposite sides of said track, said track and wheels being so correlated in their shapes as to substantially limit movement of said wheels transversely of said track, flexible towing means interconnecting said two track follower assemblies at their junction, said first track follower assembly and said first suspension means forming a first movable unit, said second track follower and said second suspension means forming a second movable unit, said movable units being without rigid interattachment, whereby said track follower assemblies can assume various angular positions as seen in top plan view with respect to each other whereby they can turn a horizontal corner in said track independently of each other.

2. The combination of claim 1 in which one of said track follower assemblies has two spaced pairs of trolleys arranged as said one pair, all of said pairs being spaced a substantial distance apart lengthwise of said track.

3. The combination of claim 1 in which said battery assembly is provided with contact members on the outer side thereof and in further combination with stationary contact members disposed in a position for engaging said battery assembly contact members at times when said battery assembly is suspended from said track in a certain battery charging position, and said stationary contact members being connected to a source of power suitable for the charging of said battery.

References Cited by the Examiner
UNITED STATES PATENTS
| | | | |
|---|---|---|---|
| 1,256,214 | 2/1918 | Eaton | 105—50 |
| 1,425,689 | 8/1922 | Powell | 320—2 |
| 1,711,401 | 4/1929 | Baldwin | 105—154 |
| 2,821,146 | 1/1958 | Mahrle | 212—21 |
| 3,079,510 | 2/1963 | Hartung | 320—2 |

FOREIGN PATENTS
| | | |
|---|---|---|
| 677,258 | 12/1963 | Canada. |
| 589,684 | 2/1925 | France. |

EVON C. BLUNK, *Primary Examiner.*

ANDRES H. NIELSEN, SAMUEL F. COLEMAN, *Examiners.*

L. LEVINE, *Assistant Examiner.*